Patented Nov. 15, 1949

2,487,881

UNITED STATES PATENT OFFICE 2,487,881

PROCESS FOR PREPARING POLYMETHINE DYES

Edward B. Knott, Wealdstone, England, assignor to Eastman Kodak Company, Rochester, N. Y., a corporation of New Jersey No Drawing. Application January 19, 1945, Serial No. 573,626. In Great Britain March 28, 1944

8 Claims. (Cl. 260—240)

This invention relates to a process for preparing polymethine dyes, especially photographic sensitizing polymethine dyes, and to intermediates useful in the preparation of such dyes.

A number of methods have been proposed for preparing symmetrical carbocyanine dyes (trimethine cyanine dyes). For certain symmetrical carbosyanine dyes, one of the most useful processes involves the condensation of an orthoformic ester, in the presence of a basic condensing agent, with a quaternary salt of a heterocyclic nitrogen compound having a methyl group attached to the carbon atom in the 2- or 4-position to the quaternary nitrogen atom. It is also known that certain symmetrical carbocyanine dyes can be prepared by condensing, in the presence of an aliphatic carboxylic anhydride and the alkali metal salt of an aliphatic carboxylic acid, a diarylformamidine with a quaternary salt of a heterocyclic nitrogen compound of the aforesaid kind.

It is also known that equimolecular proportions of a diarylformamidine and a quaternary salt of a heterocyclic nitrogen compound of the aforesaid kind can be condensed, in the presence of an aliphatic carboxylic anhydride and an alkali metal salt of an aliphatic carboxylic acid, to give a quaternary salt of a heterocyclic nitrogen compound having a β-acylarylaminovinyl group attached to the carbon atom in the 2- or 4-position to the quaternary nitrogen atom. It is known that these β-acylarylaminovinyl compounds can be condensed, in the presence of basic condensing agents, with quaternary salts of heterocyclic nitrogen compounds having a methyl group attached to the carbon atom in the 2- or 4-position to the quaternary nitrogen atom, to give symmetrical or unsymmetrical carbocyanine dyes. It is also known that the aforesaid β-acylarylaminovinyl compounds can be condensed, in the presence of basic condensing agents, with compounds containing a ketomethylene group (—CO—CH$_2$—) to give merocarbocyanine dyes.

I have now found that symmetrical carbocyanine dyes can be made by condensing a quaternary salt of a heterocyclic nitrogen compound having a methyl group attached to the carbon atom in the 2- or 4-position to the quaternary nitrogen atom, with formamide, thioformamide, thioformanolide or formamidoxime. Of these four compounds, formamide is the least reactive and requires fusion at an elevated temperature, e. g. 150° to 160° C., preferably employing the alkyl toluenesulfonate of the nitrogen base. Thioformanilide reacts with the quaternary salts readily in alkaline media, e. g. pyridine, or in acetic anhydride containing an alkali metal acetate. Thioformamide reacts best in alkaline-alcoholic media, e. g. alcoholic triethylamine or sodium ethylate. Formamidoxime reacts best in acetic anhydride containing an acid-binding agent, such as pyridine or triethylamine.

It will thus be seen that a wide variety of condensing agents may be used, e. g. alcoholic solutions of alkali hydroxides or of alkali alcoholates; organic bases, such as pyridine, piperidine, trimethylamine, triethylamine or their alcoholic solutions, alkalis, such as alkali hydroxides or carbonates, or condensing agents, such as acetic anhydride containing sodium acetate. The most suitable condensing agent for any particular quaternary salt can readily be ascertained by the customary observations and depends to a considerable extent, as indicated above, upon whether formamide, thioformamide, thioformanilide or formamidoxime is employed.

In place of alkyl toluenesulfonates, I may use other quaternary salts, such as alkyl halides or alkyl sulfates, as well as the corresponding aralkyl quaternary salts.

The reaction takes place between two molecules of the quaternary salt and one molecule of the formamide, thioformamide, thioformanilide or formamidoxime, but it is not essential in all cases to bring the reagents into contact in these proportions although it is preferred to do so. It has been observed, however, and this constitutes a further feature of the invention, that intermediates consisting of β-acetamidovinyl compounds are obtained when substantially equimolecular proportions are used and when the condensing agent is acetic anhydride, provided also that if the other reagent is thioformamide the quaternary salt is an alkyl halide, or if the other reagent is formamidoxime, the quaternary salt is not an alkyl halide. With formamide or formamidoxime these intermediates are formed even from the alkyl paratoluenesulfonates or alkyl sulfates; with formamidoxime, alkyl paratoluenesulfonates are preferred. Thioformanilide, however, does not give such intermediates.

These β-acetamidovinyl intermediates are useful for making carbocyanine dyes by condensation with heterocyclic nitrogen quaternary salts having a methyl group attached to the carbon atom in the 2- or 4-position to the quaternary nitrogen atom, such as quinaldine or lepidine quaternary salts, or for making merocarbocyanine dyes by condensation with compounds having ketomethylene groups.

The quaternary salts employed may be derived from a quinoline, a pyridine, a thiazole, a thiazoline, a benzthiazole, a naphthathiazole, an oxazole, and oxazoline, a benzoxazole, a naphthoxazole, a selenazole, a benzselenazole, an indole, a thiazine or a benzthiazine. Benzthiazolium salts, such as those described in United States Patents 2,317,357, dated April 27, 1943, and 2,330,203, dated September 28, 1943, may be used.

The following examples to which the invention is not limited, show further how it may be put into practice.

*Example I.—3:3'-dimethylthiocarbocyanine iodide*

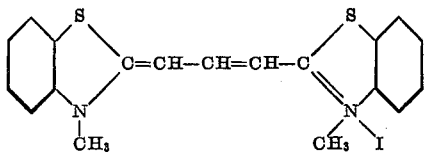

2-methylbenzthiazole metho-p-toluenesulfonate (3.35 g.) and thioformamide (0.33 g.) were refluxed in ethyl alcohol (30 cc.) to dissolve and triethylamine (0.5 cc.) added and the mixture refluxed for 30 minutes. The deep red solution was poured into aqueous potassium iodide and the required dye collected and recrystallized from methanol in the form of coppery needles giving a red solution in alcohol. Yield 66 per cent.

*Example II.—3:3'-dimethylcarbocyanine iodide*

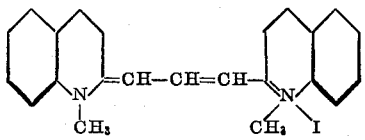

Quinaldine metho-p-toluenesulfonate (3.29 g.) and thioformamide (0.33 g.) were dissolved in ethyl alcohol (75 cc.) and triethylamine (0.5 cc.) added; on refluxing further a thick meal of the required toluenesulfonate separated. This was collected, dissolved in alcohol and the iodide precipitated by pouring into aqueous potassium iodide. Recrystallized from methanol, it formed green needles giving a pure blue solution in alcohol. Yield 58 per cent.

*Example III.—3:3'-diethylcarbocyanine iodide*

As for Example II, using quinaldine etho-p-toluenesulfonate (3.45 g.) gave a 45 per cent yield of green needles after recrystallization from methanol.

*Example IV.—3:3'-diethylcarbocyanine iodide*

Quinaldine etho-p-toluenesulfonate (3.43 g.) and formamide (0.25 g.) were fused at 160° C. for one hour. The clear melt slowly turned blue and partially solidified to a mass of green crystals. These were collected, washed with a little acetone, dissolved in alcohol and poured into aqueous potassium iodide. The required iodide was then recrystallized from methanol.

*Example V.—3:3'-diethylcarbocyanine iodide*

Quinaldine ethiodide (2.99 g.) and thioformanilide (1.37 g.) were refluxed in pyridine (50 cc.) for 1 hour. The dye was collected and recrystallized from methanol as green needles.

*Example VI.—3:3'-dimethylthiocarbocyanine iodide*

2-methylbenzthiazole metho-p-toluene sulfonate (3.29 g.) and thioformanilide (1.37 g.) were refluxed in acetic anhydride (100 cc.) and anhydrous sodium acetate (0.82 g.) for 30 minutes. The acetic anhydride was removed under reduced pressure and the dye taken up in alcohol and poured into aqueous potassium iodide.

*Example VII.—2-β-acetamidovinylquinoline eth-iodide*

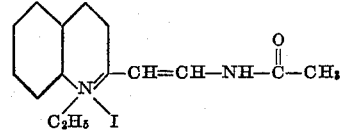

Quinaldine ethiodide (2.99 g.) and thioformamide (0.67 g.) were refluxed in acetic anhydride (100 cc.) for 45 minutes and allowed to cool. The crystalline precipitate was collected and recrystallized from alcohol. It then formed pale brown needles, M. P. 258° C. Yield 2.4 g.

*Example VIII.—2-β-acetamidovinylbenzthiazole ethiodide*

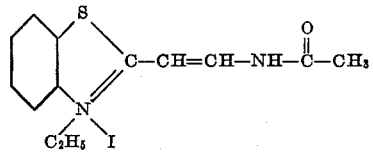

2-methylbenzthiazole ethiodide (3.05 g.), thioformamide (0.67 g.) and acetic anhydride (12 cc.) were refluxed for 45 minutes. A red color developed which slowly faded. After cooling, the solid was collected and recrystallized from alcohol forming pale brown needles, M. P. 240° to 241° C.

*Example IX.—2-β-acetamidovinylbenzoxazole ethiodide*

2-methylbenzoxazole ethiodide (2.99 g.), thioformamide (0.67 g.) and acetic anhydride (10 cc.) were heated at 100° C. on the water bath for 1 hour. The required substance was precipitated as an orange oil by adding ether. The ether was decanted and a few drops of alcohol added to the oil which crystallized. Recrystallized from a little alcohol, it formed flat pink needles M. P. 216° to 217° C.

*Example X.—2-β-acetamidovinylquinoline eth-iodide*

Quinaldine etho-p-toluenesulfonate (3.43 g.), formamide (0.45 g.) and acetic anhydride (15 cc.) were refluxed for 1 hour, acetic acid (5 cc.) was added and the mixture poured into aqueous potassium iodide. The required iodide separated as pale brown needles. Yield 3.2 g. M. P. 359° C.

*Example XI.—2-β-acetamidovinylquinoline eth-iodide*

Quinaldine ethiodide (2.99 g.), formamide (0.45 g.) acetic anhydride (100 cc.) were refluxed for 45 minutes and allowed to cool. The needles which separated were recrystallized from alcohol M. P. 258° C.

*Example XII.—2-β-acetamidovinylbenzthiazole ethiodide*

2-methylbenzthiazole ethiodide (3.05 g.), formamide (0.45 g.) and acetic anhydride (105 cc.) were refluxed for 45 minutes and allowed to cool. The reddish needles were recrystallized from alcohol and had M. P. 240° C.

*Example XIII.—2-β-acetamidovinylbenzoxazole ethiodide*

2-methylbenzoxazole ethiodide (2.89 g.), formamide (0.45 g.) and acetic anhydride (10 cc.) were refluxed for 30 minutes, the required substance precipitated by adding ether and the oil crystallized from methanol M. P. 217° C.

*Example XIV.—2-β-acetamidovinylquinoline eth-iodide*

Quinaldine etho-p-toluenesulfonate (3.43 g.), formamidoxime (0.60 g.) and acetic anhydride (5 cc.) were refluxed for 15 minutes. The solution turned deep yellow. The acetic anhydride was removed in vacuo and the residue dissolved in water (5 cc.). On pouring into a saturated solution of potassium iodide and standing overnight, the required ethiodide separated as yellow-brown crystals. Recrystallized from alcohol, they formed yellow-brown needles M. P. 258° C.

*Example XV.—2 - β - acetamidovinylbenzthiazole ethiodide*

Proceeding as above and using 2-methylbenzthiazole etho-p-toluenesulfonate (3.49 g.), the required substance was obtained as reddish crystals M. P. 240° to 241° C.

*Example XVI.—2-β - acetamidovinylbenzoxazole ethoperchlorate*

2-methylbenzoxazole etho-p - toluenesulfonate (3.33 g.) formamidoxime (0.60 g.) and acetic anhydride (5 cc.) were refluxed for 15 minutes, the acetic anhydride removed in vacuo and the residue dissolved in water (5 cc.). This solution was then poured into a saturated solution of sodium perchlorate. On standing overnight, the required substance separated. It was recrystallized from boiling water and formed beautiful, long, pale orange, glassy needles M. P. 181° to 183° C. containing water of crystallization.

The β-acetamidovinyl compounds prepared in accordance with my invention can be condensed with compounds containing a ketomethylene (—CO—CH$_2$—) or a thioketomethylene (—CS—CH$_2$—) group, in the presence of a basic condensing agent, to give merocarbocyanine dyes. In British Patent 432,628, accepted July 23, 1935, the preparation of merocyanine dyes using β-acetamidovinyl compounds is proposed. However, no examples are given in that patent, the examples provided always involving the use of a β-acetanilidovinyl compound. The basic condensing agent proposed in the British patent is pyridine. I have found, however, that by using alkali metal or alkaline earth metal hydroxides or carbonates or alcoholates, as the condensing agent, much higher yields can be obtained than are obtained when pyridine is used as the basic condensing agent in connection with β-acetamidovinyl compounds. Often, yields of 50 or 60 per cent can be obtained. On the other hand, with pyridine as the basic condensing agent, it is extremely difficult to get yields of more than a few per cent.

The compound having a methylene group adjacent to a carbonyl or thiocarbonyl group may be an open chain compound or a cyclic compound, especially a heterocyclic compound. Examples of open chain compounds which may be used are ethyl-2-quinolyl pyruvate, acetylacetone, acetoacetamides, cyanoacetamides and benzoylacetonitrile. Examples of cyclic compounds are thiazolones (such as isothiohydantoin), thiazolidones, thiazolediones, thiothiazolediones (rhodanines), barbituric acids, thiobarbituric acids, oxazolones (such as those derived from hippuric acid and aceturic acid), iminazolediones (hydantoins), thioiminazolediones (thiohydantoins), pyrazolones, 1,3-cyclohexandiones, 2,4-dihydroxyquinolines, oxydihydroquinoxalines, dihydrocarbostyrils, coumaranones, oxindoles, ketodihydrobenzparathiazines, benzo - β - morpholones, homophthalimide and succinimide, indanedione, tetronic acid, ketodihydrothionaphthenes such as thioindoxyl, and indoxyls.

The following examples illustrated how the invention may be practiced.

*Example XVII.—3 - ethyl - 5 - (3-ethyl - 2 - benzoxazylidene-ethylidene) - 1-phenyl - 2 - thiohydantoin*

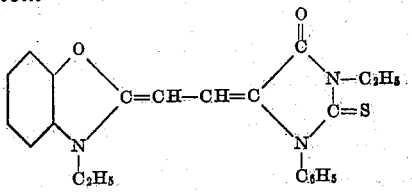

2-β-acetamidovinylbenzoxazole ethiodide (358 mg. .001 mol. 1-phenyl-3-ethyl-2-thiohydantoin (222 mg. .001 mol.) were dissolved in ethyl alcohol (2.5 cc.) and a solution of sodium (23 mg.) in alcohol (1 cc.) added to the mixture of 40° C. The dye began crystallizing at once. It was collected after chilling and recrystallized from spirit in orange needles.

*Example XVIII.—3-ethyl-5-(1-ethyl-2-quinolylidene-ethylidene) rhodanine*

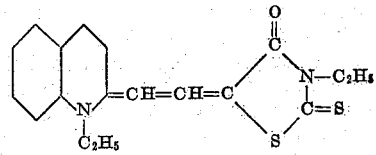

2-β-acetamidovinylquinoline ethiodide (368 mg., .001 mol.) and 3-ethyl rhodanine (161 mg., .001 mol.) were dissolved in alcohol (5 cc.) and a solution of potassium hydroxide (56 mg.) in ethyl alcohol (5 cc.) added at 60° C. The required dye separated after a short time. It formed bluish grey crystals giving a purple alcoholic solution.

Other dyes which may be made in the manner of the foregoing examples are:

3 - ethyl - 5 - (3 - ethyl - 2 - benzthiazylidene-ethylidene)-1-phenyl-2-thiohydantoin
3 - ethyl - 5 - (1 - ethyl - 2 - quinolylidene - ethylidene)-1-phenyl-2-thiohydantoin
3 - ethyl - 5 - (3 - ethyl - 2 - benzoxazylidene-ethylidene)-rhodanine
3 - ethyl - 5 - (3 - ethyl - 2 - benzthiazylidene-ethylidene)-rhodanine
5 - (3 - ethyl - 1 - benzoxazylidene - ethylidene)-1:3-diphenyl-rhodanine
5 - (3 - ethyl - 1 - benzthiazylidene - ethylidene)-1:3-diphenylrhodanine
5 - (1 - ethyl - 2 - quinolylidene - ethylidene)-1:3-diphenylrhodanine

What I claim as my invention and desire to be secured by Letters Patent of the United States is:

1. A process for preparing a carbocyanine dye comprising condensing one molecular proportion of a compound selected from the group consisting of formamide, thioformamide, thioformanilide and formamidoxime, with two molecular proportions of a quaternary salt of a heterocyclic nitrogen base containing a methyl group attached to the carbon atom in the position selected from the group consisting of the 2- and the 4-positions.

2. A process for preparing a carbocyanine dye comprising condensing by heating one molecular proportion of a compound selected from the group consisting of formamide, thioformamide, thioformanilide and formamidoxime, with two molecular proportions of a quaternary salt of a heterocyclic nitrogen base containing a methyl group attached to the carbon atom in the position selected from the group consisting of the 2- and 4-positions.

3. A process for preparing a carbocyanine dye comprising fusing one molecular proportion of formamide with two molecular proportions of a quaternary salt of a heterocyclic nitrogen base containing a methyl group attached to the carbon atom in the position selected from the group consisting of the 2- and 4-positions.

4. A process for preparing a carbocyanine dye comprising fusing one molecular proportion of formamide with two molecular proportions of a quaternary alkyl toluene sulfonate of a heterocyclic nitrogen base containing a methyl group attached to the carbon atom in the position selected from the group consisting of the 2- and 4-positions.

5. A process for preparing a carbocyanine dye comprising condensing, in the presence of an acid-binding agent, one molecular proportion of thioformanilide with two molecular proportions of a quaternary salt of a heterocyclic nitrogen base containing a methyl group attached to the carbon atom in the position selected from the group consisting of the 2- and 4-positions.

6. A process for preparing a carbocyanine dye comprising condensing, in the presence of acetic anhydride and an alkali metal acetate, one molecular proportion of thioformanilide with two molecular proportions of a quaternary salt of a heterocyclic nitrogen base containing a methyl group attached to the carbon atom in the position selected from the group consisting of the 2- and 4-positions.

7. A process for preparing a carbocyanine dye comprising condensing, in the presence of an acid-binding agent, one molecular proportion of thioformamide with two molecular proportions of a quaternary salt of a heterocyclic nitrogen base containing a methyl group attached to the carbon atom in the position selected from the group consisting of the 2- and 4-positions.

8. A process for preparing a carbocyanine dye comprising condensing, in the presence of an alkaline-alcoholic acid-binding agent, one molecular proportion of thioformamide with two molecular proportions of a quaternary salt of a heterocyclic nitrogen base containing a methyl group attached to the carbon atom in the position selected from the group consisting of the 2- and 4-positions.

EDWARD B. KNOTT.

REFERENCES CITED

The following references are of record in the file of this patent:

UNITED STATES PATENTS

| Number | Name | Date |
| --- | --- | --- |
| 1,886,485 | Kuhn | Nov. 8, 1932 |
| 2,107,379 | Koslowsky | Feb. 8, 1938 |

FOREIGN PATENTS

| Number | Country | Date |
| --- | --- | --- |
| 334,706 | Great Britain | Sept. 11, 1930 |
| 432,628 | Great Britain | 1935 |

OTHER REFERENCES

Sidgwick, "Organic Chemistry of the Nitrogen Compounds"; page 151.